United States Patent
Kang et al.

(10) Patent No.: US 11,417,007 B2
(45) Date of Patent: Aug. 16, 2022

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Seongmin Kang, Suwon-si (KR); Heungwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 17/091,802

(22) Filed: Nov. 6, 2020

(65) Prior Publication Data

US 2021/0150746 A1    May 20, 2021

(30) Foreign Application Priority Data

Nov. 20, 2019    (KR) .................. 10-2019-0149859

(51) Int. Cl.
   *G06T 7/593*        (2017.01)
   *G06K 9/62*         (2022.01)
   (Continued)

(52) U.S. Cl.
   CPC ............ *G06T 7/593* (2017.01); *G06K 9/6232* (2013.01); *G06K 9/6267* (2013.01); *G06N 3/08* (2013.01);
   (Continued)

(58) Field of Classification Search
   CPC ........... G06T 7/593; G06T 2207/20084; G06T 2207/10004; G06T 2207/10024;
   (Continued)

(56) References Cited

U.S. PATENT DOCUMENTS 9,594,984 B2    3/2017    Yu et al.
9,809,227 B2 *  11/2017   Kojima .................. G01S 17/931
(Continued)

FOREIGN PATENT DOCUMENTS

JP    2018-190332 A    11/2018
JP    6912215 B2       8/2021
(Continued)

OTHER PUBLICATIONS

International Search Report (PCT/ISA/210), issued by International Searching Authority in corresponding International Application No. PCT/KR2020/012200, dated Dec. 3, 2020.
(Continued)

*Primary Examiner* — Michael S Osinski
(74) *Attorney, Agent, or Firm* — Sughrue Mion, PLLC

(57) ABSTRACT

A method of controlling an electronic apparatus includes acquiring an image and depth information of the acquired image; inputting the acquired image into a neural network model trained to acquire information on objects included in the acquired image; acquiring an intermediate feature value output by an intermediate layer of the neural network model; identifying a feature area for at least one object among the objects included in the acquired image based on the intermediate feature value; and acquiring distance information between the electronic apparatus and the at least one object based on the feature area for the at least one object and the depth information.

20 Claims, 12 Drawing Sheets

(51) Int. Cl.
  *G06N 3/08* (2006.01)
  *G06V 10/40* (2022.01)
(52) U.S. Cl.
  CPC .... *G06V 10/40* (2022.01); *G06T 2207/20084* (2013.01)
(58) Field of Classification Search
  CPC . G06T 2207/10028; G06T 2207/10016; G06T 2207/20081; G06T 7/55; G06T 7/11; G06T 2210/12; G06K 9/6232; G06K 9/6256; G06K 9/6262; G06K 9/6274; G06K 9/6267; G06K 9/627; G06K 9/628; G06K 9/6271; G06K 9/629; G06N 3/08; G06N 3/0454; G06N 3/084; G06N 3/04; G06N 3/0472; G06N 3/0445; G06N 3/046; G06V 10/82; G06V 10/454; G06V 10/25; G06V 10/40; G06V 10/22; G06V 10/267; G06V 10/462; G06V 10/50; G06V 10/62; G06V 20/20; G06V 20/58; G06V 20/64; H04N 13/271
  See application file for complete search history.

(56) References Cited

U.S. PATENT DOCUMENTS

| | | | |
|---|---|---|---|
| 9,946,960 B1* | 4/2018 | Kim | G06N 3/0454 |
| 10,311,338 B1* | 6/2019 | Kim | G06V 10/82 |
| 10,402,977 B1* | 9/2019 | Kim | G06V 10/82 |
| 10,410,352 B1* | 9/2019 | Kim | G06N 20/00 |
| 10,489,684 B2 | 11/2019 | Choi et al. | |
| 10,551,846 B1* | 2/2020 | Kim | G06N 20/00 |
| 10,579,924 B1* | 3/2020 | Kim | G06N 5/046 |
| 10,769,411 B2* | 9/2020 | Grabner | G06T 7/75 |
| 10,803,364 B2* | 10/2020 | Fukagai | G06T 7/251 |
| 10,885,372 B2 | 1/2021 | Tsunoda et al. | |
| 10,970,518 B1* | 4/2021 | Zhou | G06K 9/6232 |
| 11,010,605 B2* | 5/2021 | Nord | G06K 9/6227 |
| 11,048,266 B2 | 6/2021 | Jeon | |
| 11,106,903 B1* | 8/2021 | Huynh | G06V 10/50 |
| 11,126,855 B2* | 9/2021 | Kim | G06V 20/64 |
| 11,163,989 B2* | 11/2021 | Sun | G06N 3/0454 |
| 11,164,003 B2* | 11/2021 | Jones | G06N 3/0472 |
| 11,170,512 B2* | 11/2021 | Zhang | G06V 10/255 |
| 11,216,674 B2* | 1/2022 | Ogale | B60R 1/00 |
| 2017/0083792 A1* | 3/2017 | Rodríguez-Serrano | G06T 7/74 |
| 2017/0083796 A1* | 3/2017 | Kim | G06V 10/82 |
| 2017/0262750 A1* | 9/2017 | Kozuka | G06N 3/08 |
| 2018/0025249 A1* | 1/2018 | Liu | G06V 10/82 382/158 |
| 2018/0032840 A1* | 2/2018 | Yu | G06K 9/6267 |
| 2018/0068459 A1 | 3/2018 | Zhang et al. | |
| 2018/0165551 A1* | 6/2018 | Roh | G06V 10/82 |
| 2018/0276527 A1* | 9/2018 | Motoya | G06F 40/216 |
| 2018/0330183 A1 | 11/2018 | Tsunoda et al. | |
| 2019/0050691 A1 | 2/2019 | Lee et al. | |
| 2019/0072977 A1 | 3/2019 | Jeon | |
| 2019/0080456 A1* | 3/2019 | Song | G06T 7/11 |
| 2019/0130575 A1* | 5/2019 | Chen | G06N 3/084 |
| 2019/0156157 A1 | 5/2019 | Saito et al. | |
| 2019/0244028 A1* | 8/2019 | Jones | G06V 20/00 |
| 2019/0258878 A1 | 8/2019 | Koivisto et al. | |
| 2019/0294893 A9 | 9/2019 | Berberian et al. | |
| 2019/0311249 A1* | 10/2019 | Zhang | G06F 17/15 |
| 2020/0005074 A1* | 1/2020 | Wang | G06V 10/82 |
| 2020/0134375 A1* | 4/2020 | Zhan | G06N 3/084 |
| 2020/0311943 A1* | 10/2020 | Dai | G06K 9/6232 |
| 2020/0394458 A1* | 12/2020 | Yu | G06V 10/25 |
| 2020/0402251 A1 | 12/2020 | Ban et al. | |
| 2020/0410273 A1* | 12/2020 | Miao | G06V 10/255 |
| 2021/0174133 A1* | 6/2021 | Nitsch | G06V 10/454 |
| 2021/0278858 A1 | 9/2021 | Jeon | |
| 2021/0286977 A1* | 9/2021 | Chen | G06V 40/171 |
| 2021/0335002 A1* | 10/2021 | Wang | G06K 9/629 |
| 2021/0365716 A1* | 11/2021 | Li | H04N 5/247 |
| 2021/0406600 A1* | 12/2021 | Chae | G06T 7/70 |
| 2021/0406615 A1* | 12/2021 | Rao | G06K 9/6268 |
| 2022/0067421 A1* | 3/2022 | Zhang | G06V 10/82 |
| 2022/0101644 A1* | 3/2022 | Wei | G06N 3/0454 |

FOREIGN PATENT DOCUMENTS

| | | |
|---|---|---|
| KR | 10-0938195 B1 | 1/2010 |
| KR | 10-1735997 B1 | 5/2017 |
| KR | 10-2017-0070715 A | 6/2017 |
| KR | 10-2017-0119167 A | 10/2017 |
| KR | 10-1921608 B1 | 11/2018 |
| KR | 10-2019-0026116 A | 3/2019 |
| KR | 10-2019-0102906 A | 9/2019 |

OTHER PUBLICATIONS

Written Opinion (PCT/ISA/237) issued by the International Searching Authority in corresponding International Application No. PCT/KR2020/012200, dated Dec. 3, 2020.

* cited by examiner

ELECTRONIC APPARATUS AND METHOD FOR CONTROLLING THEREOF

CROSS-REFERENCE TO RELATED APPLICATION(S)

This application is based on and claims priority under 35 U.S.C. § 119 to Korean Patent Application No. 10-2019-0149859, filed on Nov. 20, 2019 in the Korean Intellectual Property Office, the disclosure of which is incorporated by reference herein in its entirety.

BACKGROUND

1. Field

The disclosure relates to an electronic apparatus and a method for controlling thereof, and more particularly, to acquiring distance information between an electronic apparatus and an object by using an output value of an intermediate layer of an object recognition neural network model.

2. Description of Related Art

Artificial intelligence systems are being used in various fields. In an artificial intelligence system, a machine learns, determines, and becomes smarter by itself, unlike related art rule-based smart systems. An artificial intelligence system shows a more improved recognition rate as it is used more, and becomes capable of understanding user preference more correctly. For this reason, related art rule-based smart systems are gradually being replaced by deep learning-based artificial intelligence systems.

An artificial intelligence technology consists of machine learning (e.g., deep learning) and element technologies utilizing machine learning.

Machine learning refers to an algorithm technology of classifying/learning the characteristics of input data by itself, and an element technology refers to a technology for performing functions of a human brain such as cognition and determination by using a machine learning algorithm such as deep learning, and includes fields of technologies such as linguistic understanding, visual understanding, inference/prediction, knowledge representation, and operation control. In particular, linguistic understanding is a technology of recognizing languages/characters of humans, and applying/processing them, and includes natural speech processing, machine translation, communication systems, queries and answers, voice recognition/synthesis, and the like.

Recently, attempts to acquire distance information of an object by using an artificial intelligence system are being actively pursued. However, there is a problem that, in the case that another obstacle exists, other than an object to be recognized on an image, or a plurality of objects overlap on one image, the accuracy of the distance information of the object decreases.

SUMMARY

Embodiments provide an electronic apparatus which acquires distance information of an object with improved accuracy.

Additional aspects will be set forth in part in the description which follows and, in part, will be apparent from the description, or may be learned by practice of the presented embodiments.

In accordance with an aspect of the disclosure, there is provided an electronic device which includes a memory storing at least one instruction, and a processor executing at least one instruction stored in the memory, wherein the processor is configured to, by executing the at least one instruction, acquire an image and depth information of the image, input the acquired image into a neural network model trained to acquire information on objects included in an image, and acquire an intermediate feature value output by the intermediate layer of the neural network model, identify feature areas for at least one object included in the image based on the intermediate feature value, and acquire distance information between the electronic apparatus and the at least one object based on the feature areas for the at least one object and the depth information of the image.

The processor may be configured to input the acquired image into the neural network model and acquire a final feature value output by the final layer of the neural network model, identify type information for each of the at least one object included in the image and information on the object areas based on the acquired final feature value, and acquire a feature map including the feature areas for the at least one object included in the image based on the intermediate feature value.

The processor may be configured to map the acquired feature map and the object areas for each of the at least one object and identify feature areas corresponding to each of the at least one object.

The feature map may be acquired by summing up a plurality of intermediate feature values acquired by a plurality of predefined intermediate layers.

The processor may be configured to acquire a representative value based on feature pixels corresponding to the feature areas among the depth information of the image, and map the representative value to the feature areas and acquire the distance information.

The processor may be configured to generate an image wherein the type information and the distance information are displayed around the object areas for each of the at least one object.

The electronic apparatus may include a display and the processor may be configured to control the display such that the generated image is output.

The processor may be configured to transmit a signal to an external apparatus through the communication interface such that the generated image is output through the external apparatus.

The processor may be configured to acquire the depth information of the image through a depth camera or a stereo camera, or acquire the depth information of the image by analyzing the acquired image.

The intermediate layer may include a first intermediate layer corresponding to an object of a first type, and the processor may be configured to: identify a first feature area for the object of the first type based on a first intermediate feature value output by the first intermediate layer, acquire a first representative value based on a feature pixel corresponding to the first feature area among the depth information of the image, and map the first representative value to the first feature area and acquire the first distance information.

In accordance with an aspect of the disclosure, there is provided a method for controlling an electronic apparatus including the steps of acquiring an image and depth information of the image, inputting the acquired image into a neural network model trained to acquire information on objects included in an image, and acquiring an intermediate feature value output by an intermediate layer of the neural network model, identifying feature areas for at least one object included in the image based on the intermediate feature value, and acquiring distance information between the electronic apparatus and the at least one object based on the feature areas for the at least one object and the depth information of the image.

According to embodiments, a user can acquire distance information of an object with improved accuracy through an electronic apparatus.

Accordingly, user convenience and satisfaction can be improved.

BRIEF DESCRIPTION OF THE DRAWINGS

The above and/or other aspects, features, and advantages of certain embodiments of the present disclosure will be more apparent from the following description taken in conjunction with the accompanying drawings, in which.

DETAILED DESCRIPTION

Figure 1:
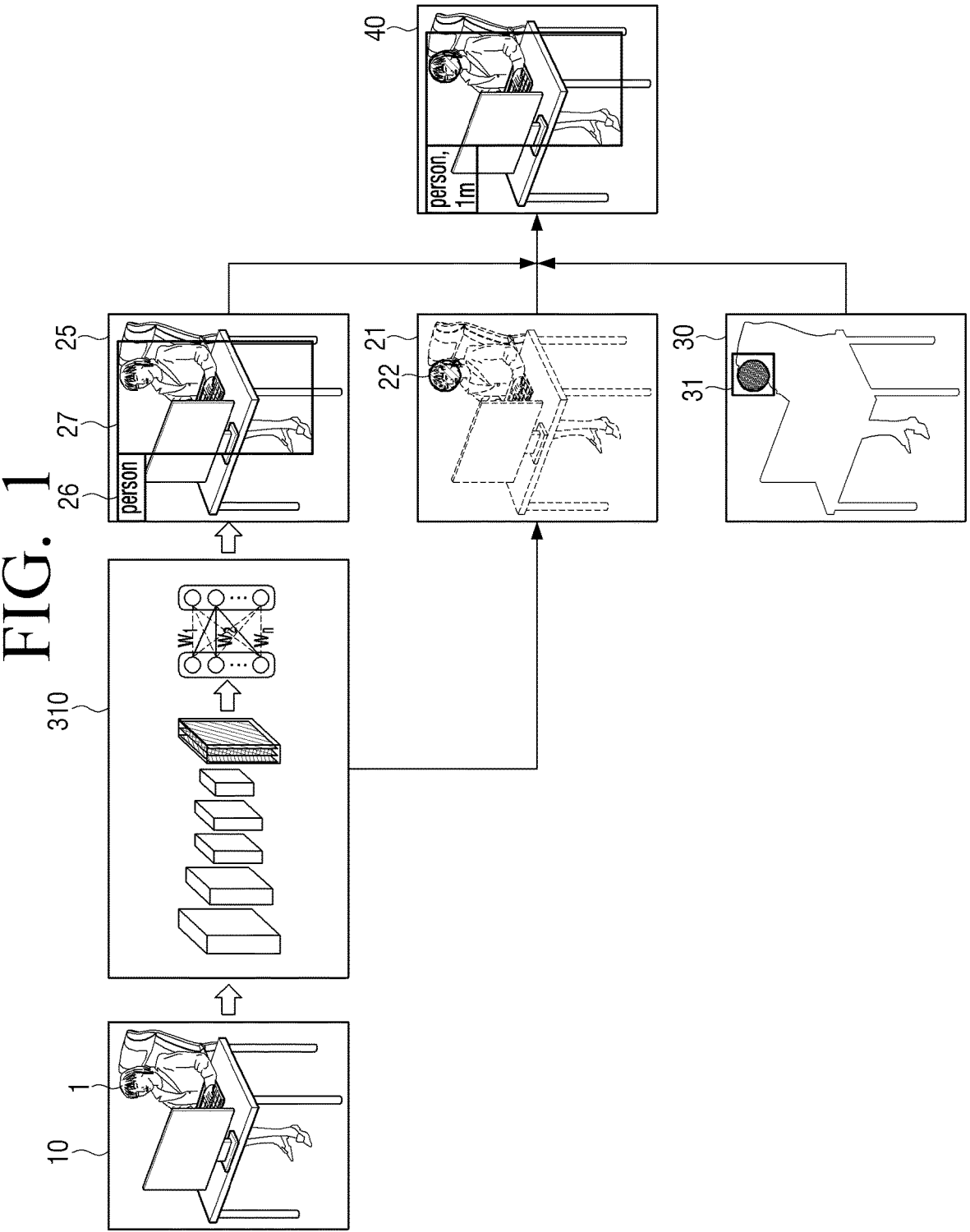
FIG. 1 is a diagram illustrating an operation of an electronic apparatus according to an embodiment.

The common terms that are currently used widely are used as much as possible, in consideration of the functions described herein. However, with time, the common terms may change depending on the intention of those skilled in the art who work in the pertinent field, court decisions, or emergence of new technologies. Also, herein, there may be terms that are selected by the applicant, and in such cases, the meaning of the terms is described in detail below. Thus, the terms used herein should be defined based on the meaning of the terms and the overall content of the described, and not just based on the names of the terms.

As used herein, the terms such as "1st" or "first," "2nd" or "second," etc., may modify corresponding components regardless of importance or order and are used to distinguish one component from another without limiting the components.

Singular expressions include plural expressions, as long as they do not obviously mean differently in the context. In addition, terms such as "include" and "consist of" should be construed as designating that there are such characteristics, numbers, steps, operations, elements, components, or a combination thereof described in the specification, but not to exclude in advance the existence or possibility of adding one or more of other characteristics, numbers, steps, operations, elements, components, or a combination thereof.

Hereinafter, certain embodiments will be described with reference to the accompanying drawings. However, it should be noted that embodiments may be implemented in various different forms, and the present disclosure is not limited to embodiments described herein. In the drawings, and throughout the specification, similar components were designated by similar reference numerals.

FIG. 1 is a diagram illustrating an operation of an electronic apparatus according to an embodiment.

An electronic apparatus may acquire a photographed image 10. The electronic apparatus may input the photographed image 10 into a neural network model 310 and acquire information on a target object 1 included in the photographed image 10. Specifically, the electronic apparatus may acquire a final feature value 25 of the neural network model 310. The electronic apparatus 100 may acquire type information 26 for the target object 1 based on the final feature value 25. For example, the type information 26 may be a classification value for the target object 1.

The electronic apparatus may acquire object area information 27 for the target object 1 based on the final feature value 25. The object area information 27 may include location information of the target object 1 in the photographed image 10. For example, the object area information 27 may include a coordinate value of a bounding box set to include the target object 1.

The electronic apparatus may identify a feature area 22 based on an intermediate feature value 21. Here, a feature area may mean an area which becomes the feature of the target object 1 when the neural network model 310 recognizes the target object 1. For example, in case the target object 1 is a person, the feature area may be the surrounding area of the face of the person. However, this is merely an example, and a feature area may be defined as various areas according to the type of the target object 1. The electronic apparatus may map the intermediate feature value 21 and the object area information 27 and identify the feature area 22 corresponding to the target object 1. The feature area 22 may exist in a bounding box corresponding to the object area information 27. The electronic apparatus may extract the intermediate feature value 21 from one or more of a plurality of intermediate layers included in the neural network model 310. A feature area according to an embodiment may refer to an activation area, an activation map, or a target area.

The electronic apparatus may acquire depth information 30 of the photographed image 10. The depth information 30 may include depth information for the target object 1. The electronic apparatus may acquire the depth information 30 by various methods. For example, the electronic apparatus may acquire the depth information 30 by analyzing the photographed image 10. However, this is merely an example, and the electronic apparatus may acquire the depth information 30 based on the image data that the depth camera acquired.

The electronic apparatus may acquire distance information and/or generate an output image 40 on which the distance information is displayed, for the target object 1 based on the intermediate feature value 21 and the depth information 30. The electronic apparatus may acquire the distance information based on a feature pixel 31 corresponding to the feature area 22 of the intermediate feature value 21 among the depth information 30. Specifically, the electronic apparatus may map the representative value of the feature pixel 31 to the intermediate feature value 21 and acquire the distance information. The representative value of the feature pixel 31 may be at least one of the mode, the intermediate value, the average value, or the minimum value of the feature pixel 31. The distance information may be the distance information from the camera that acquired the photographed image 10 to the target object 1. For example, in case the electronic apparatus photographed the target object 1, the distance information may be the distance information from the electronic apparatus to the target object 1.

The electronic apparatus may generate an image based on the type information 26, the object area information 27, and the distance information for the target object 1. For example, the electronic apparatus may generate an image including the type information 26, the object area information 27, and the distance information for the target object 1. The electronic apparatus may output the generated image through the display, or transmit the image to another external apparatus.

Figure 2:
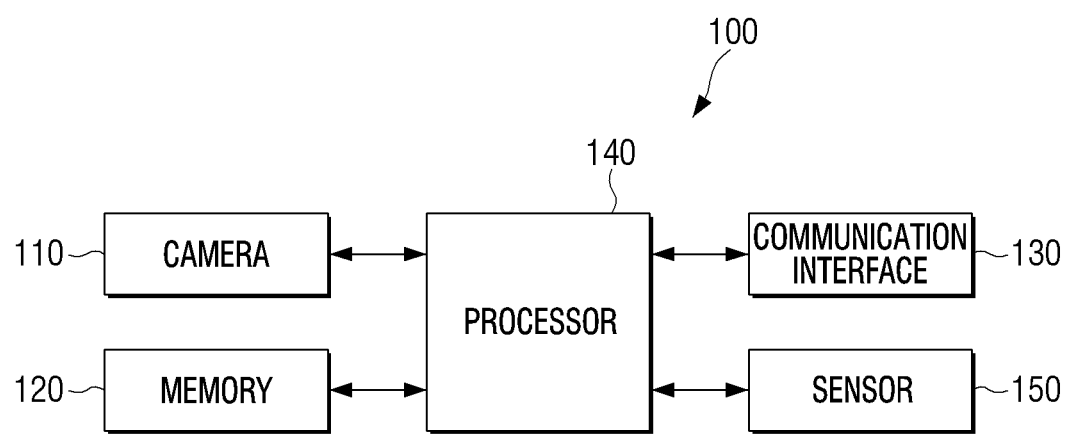
FIG. 2 is a block diagram illustrating a configuration of an electronic apparatus according to an embodiment.

FIG. 2 is a block diagram illustrating a configuration of an electronic apparatus according to an embodiment. Referring to FIG. 2, the electronic apparatus 100 may include a camera 110, a memory 120, a communication interface 130, a processor 140, and a sensor 150. The electronic apparatus 100 does not necessarily have to be implemented to include all of the above-mentioned components, but it may be implemented only with some of the components.

The camera 110 may acquire various images. For example, the camera 110 may be installed on the electronic apparatus 100 and photograph the surroundings of the electronic apparatus 100 and acquire an image. The camera 110 may include various types of cameras. For example, the camera 110 may include an RGB camera and an IR camera based on 2D. The camera 110 may include a Time of Flight (ToF) camera and a stereo camera based on 3D.

The memory 120 may store an operating system (OS) for controlling the overall operations of the components of the electronic apparatus 100 and instructions or data related to the components of the electronic apparatus 100. For this, the memory 120 may be implemented as a non-volatile memory (for example, a hard disc, a solid state drive (SSD), a flash memory), a volatile memory, etc.

The memory 120 may include at least one instruction. For example, the memory 120 may store an instruction which, when executed, makes the processor 140 acquire information on objects included in an image when an image is acquired from the camera 110. The memory 120 may store a neural network model (or an object recognition model, etc.) for recognizing objects. In particular, a neural network model may be executed by a generic-purpose processor (e.g., a central processing unit (CPU)) or a separate AI-dedicated processor (e.g., a graphics processing unit (GPU), a neural processing unit (NPU), etc.).

The communication interface 130 includes at least one circuit, and may perform communication with various types of external servers or external apparatuses according to various types of communication methods. For example, the communication interface 130 may include at least one of a Wi-Fi communication module, a cellular communication module, a 4th Generation (4G) mobile communication module, a 4th Generation (4G) long term evolution (LTE) communication module, or a 5th Generation (5G) mobile communication module.

The electronic apparatus 100 may acquire an image that an external apparatus photographed the surroundings of the electronic apparatus 100 through the communication interface 130. The electronic apparatus 100 may acquire information on objects included in the image acquired from the external apparatus. The electronic apparatus 100 may transmit the acquired information on the objects to the external apparatus through the communication interface 130. The electronic apparatus 100 may be a server apparatus.

The processor 140 may control the overall operations of the electronic apparatus 100.

For example, the processor 140 may acquire an image that photographed the surroundings of the electronic apparatus 100 and the depth information of the image. The processor 140 may acquire the image and the depth information of the image through the camera 110. Specifically, the processor 140 may acquire an image that an RGB camera photographed. The processor 140 may acquire the depth information of the image through a depth camera or a stereo camera that photographs the surroundings of the electronic apparatus 100. Alternatively, the processor 140 may analyze the pixel values of an image that an RGB camera photographed and acquire the depth information of the objects included in the image.

The processor 140 may input the acquired image into a neural network model trained to acquire information on objects included in an image, and acquire an intermediate feature value output by the intermediate layer of the neural network model. The processor 140 may identify feature areas for at least one object included in the image based on the intermediate feature value. The processor 140 may acquire a feature map including feature areas for at least one object included in the image based on the intermediate feature value. The feature map may be acquired by summing up a plurality of intermediate feature values acquired by a plurality of predefined intermediate layers.

The processor 140 may input the acquired image into the neural network model and identify feature areas for objects based on the final feature value output by the final layer of the neural network model. Specifically, the processor 140 may identify type information for each of the at least one object included in the image and information on the object areas based on the acquired final feature value. The processor 140 may map the feature map and the object areas for each of the at least one object and identify feature areas corresponding to each of the at least one object.

The processor 140 may acquire distance information between the electronic apparatus 100 and the at least one object based on the feature areas for the at least one object and the depth information of the image. For example, the processor 140 may map pixel values corresponding to the feature areas for the objects among the acquired depth information to the feature areas for the objects and acquire distance information between the electronic apparatus 100 and the objects. The processor 140 may acquire a representative value of the depth information of the image, and map the acquired representative value to the feature areas of the objects, and acquire distance information. The representative value may be at least one of the mode, the intermediate value, the average value, or the minimum value of the depth values of the plurality of pixels constituting the image.

The processor 140 may generate an image where the type information and the distance information of the objects are displayed around the object areas for each of the at least one object. The processor 140 may control the display included in the electronic apparatus 100 such that the generated image is displayed. Alternatively, the processor 140 may transmit a signal to an external apparatus through the communication interface 130 such that the generated image is displayed through another external apparatus. Accordingly, the electronic apparatus 100 may provide at least one of the distance information between the objects included in the image or the type information of the objects included in the image to a user from the electronic apparatus 100.

The sensor 150 may be a component for acquiring depth information for objects. For example, the sensor 150 may include a ToF sensor, a LiDAR sensor, and a radar sensor. The electronic apparatus 100 may acquire distance information of objects based on the depth information for the objects acquired by the sensor 150. The electronic apparatus 100 may analyze an image photographed by the camera 110 and acquire the depth information of objects included in the image as described above.

Figure 3:
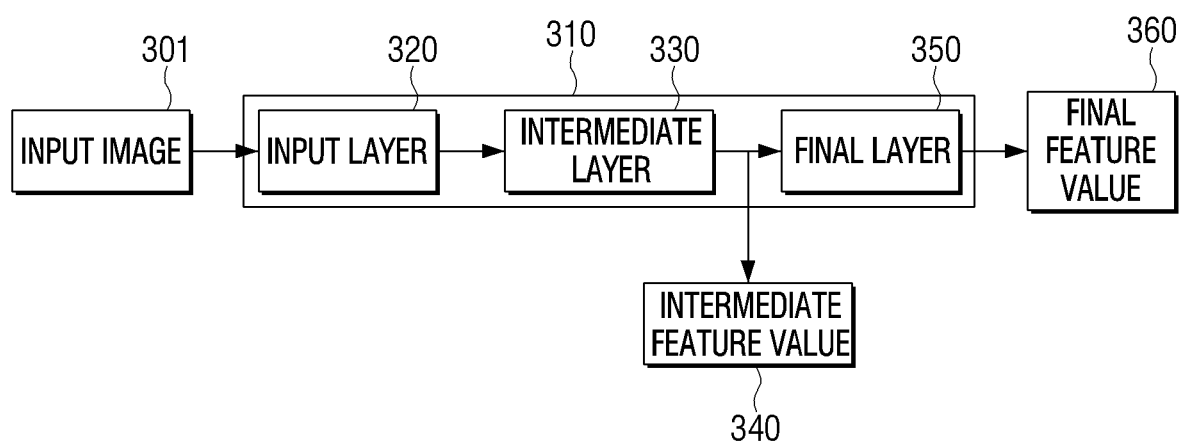
FIG. 3 is a block diagram illustrating a neural network model according to an embodiment.

FIG. 3 is a block diagram illustrating a neural network model according to an embodiment. Referring to FIG. 3, the neural network model 310 may include an input layer 320, an intermediate layer 330, and a final layer 350. Here, each layer may include a plurality of neural network layers.

The input layer 320 may receive an input image 301, and output an input feature value from the input image 301. The input layer 320 may transmit the input feature value to the intermediate layer 330. The intermediate layer 330 may extract and output an intermediate feature value 340 of the input image 301 based on the input feature value received from the input layer 320.

The processor 140 may acquire information on the feature areas for the objects included in the input image 301 based on the intermediate feature value 340. For example, the processor 140 may analyze the intermediate feature value 340 and extract feature areas for the objects included in the input image 301. The size of a component corresponding to the feature areas for the objects among the components of the intermediate feature value 340 may be bigger than the size of a component corresponding to an area where objects do not exist.

The intermediate layer 330 may transmit the intermediate feature value 340 to the final layer 350. The final layer 350 may extract and output a final feature value 360 for the input image 301 based on the intermediate feature value 340 received from the intermediate layer 330. The final feature value 360 may be related to various information for the objects. For example, the final feature value 360 may be related to at least one of the location information for the areas where the objects are located or the type information of the objects. Specifically, in case the neural network model 310 is trained to perform an operation of classifying objects, the final feature value 360 may be related to the type information of the objects. Also, in case the neural network model 310 is trained to perform an operation of recognizing objects, the final feature value 360 may be related to the location information for the areas where the objects are located or the type information of the objects.

As described above, the neural network model 310 may consist of a plurality of neural network layers. Each of the plurality of neural network layers has a plurality of weight values, and performs a neural network operation through an operation between the operation result of the previous layer and the plurality of weight values. The plurality of weight values that the plurality of neural network layers have may be optimized by a learning result of an artificial intelligence model. For example, the plurality of weight values may be updated such that a loss value or a cost value acquired from an artificial intelligence model during a learning process is reduced or minimized. An artificial neural network may include a deep neural network (DNN), and there are, for example, a convolutional neural network (CNN), a recurrent neural network (RNN), a restricted Boltzmann Machine (RBM), a deep belief network (DBN), a bidirectional recurrent deep neural network (BRDNN), or deep Q-networks, etc., but this is non-limiting.

Figure 4:
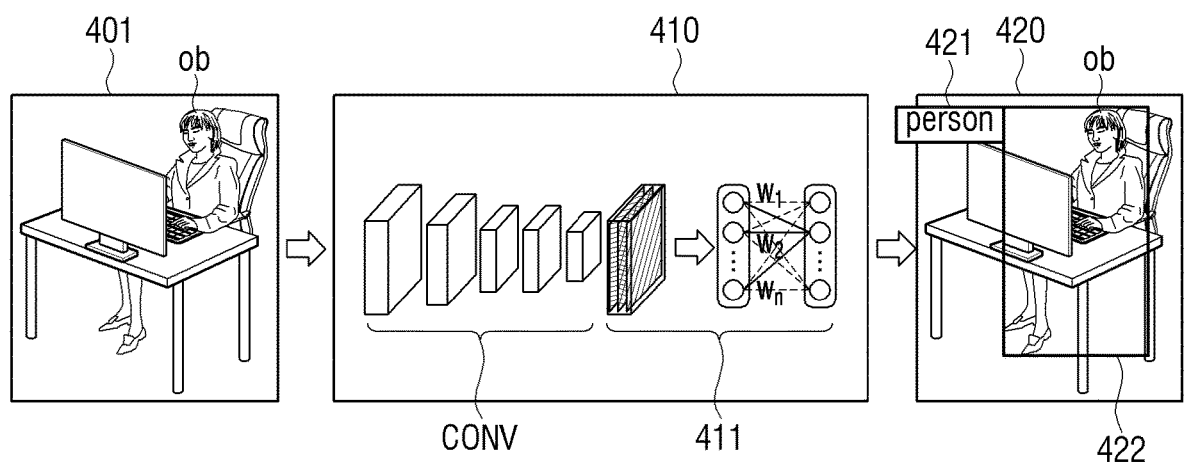
FIG. 4 is a diagram illustrating a neural network model according to an embodiment.

FIG. 4 is a diagram illustrating a neural network model according to an embodiment.

Referring to FIG. 4, the neural network model 410 may output a final feature value 420 based on an input image 401. The processor 140 may acquire the final feature value 420 output from the neural network model 410. The processor 140 may identify the type information 421 and the object area information 422 for the target object ob based on the final feature value 420. The processor 140 may generate an image based on the identified type information 421 (i.e., a person) and object area information 422.

The neural network model 410 may include a plurality of intermediate layers 411. In the plurality of intermediate layers 411, various operations may be performed. For example, an operation where intermediate feature values output by each of the plurality of intermediate layers 411 and a multiplied value of weights w1, w2, w3 corresponding to the intermediate feature values are added may be performed. Also, in the intermediate layers 411, Global Average Pooling (GAP) may be performed. The neural network model 410 may include a plurality of convolution layers (CONV). The plurality of convolution layers may be included in the intermediate layers 411.

Figure 5:
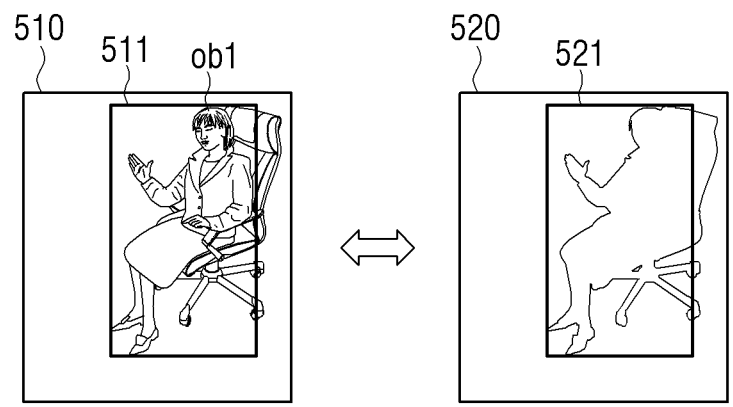
FIG. 5 is a diagram illustrating a method of acquiring distance of an object according to an embodiment.

FIG. 5 is a diagram illustrating a method of acquiring distance of an object according to an embodiment.

The processor 140 may acquire an input image 510 and object area information 511 for a first object ob1 extracted based on the input image 510. The processor 140 may input the input image 510 into the neural network model 410 in FIG. 4 and acquire the object area information 511. The processor 140 may acquire depth information 520 corresponding to the input image 510. The processor 140 may acquire distance information of the first object ob1 based on the object area information 511 and the depth information 520. Specifically, for example, the processor 140 may acquire the distance value of the first object ob1 by mapping the sub depth information 521 corresponding to the object area information 511 among the depth information 520 to the object area information 511. Specifically, the processor 140 may define the representative value of the pixels of the sub depth information 521 as the distance value of the first object ob1. The representative value may be at least one of the mode, the intermediate value, the average value, or the minimum value of the pixels corresponding to the sub depth information 521. That is, the representative value may mean the representative distance value calculated based on the plurality of pixel values respectively including distance values.

The electronic apparatus may acquire distance information of a target object in case there is another obstacle in front of the target object of which distance information is to be acquired.

Figure 6:
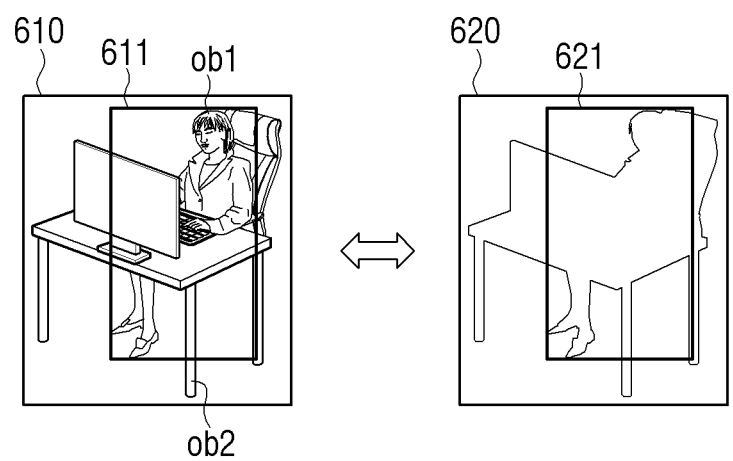
FIG. 6 is a diagram illustrating a method of acquiring distance information of an object according to an embodiment.

FIG. 6 is a diagram illustrating a method of acquiring distance information of an object according to an embodiment.

The processor 140 may acquire an input image 610 and object area information 611 for a first object ob1 extracted based on the input image 610. The processor 140 may input the input image 610 into the neural network model 410 in FIG. 4 and acquire the object area information 611. Further, the processor 140 may acquire depth information 620 corresponding to the input image 610. The depth information 620 may be a depth image corresponding to the input image 610. In this case, the processor 140 may define or acquire the distance value of the first object ob1 based on the depth information 620. For example, the processor 140 may define the distance value of the first object ob1 by mapping the sub depth information 621 corresponding to the object area information 611 among the depth information 620 to the object area information 611. Specifically, the processor 140 may define the representative value of the pixels of the sub depth information 621 to calculate the distance value of the first object ob1.

In the object area information 611, data for the second object ob2 may be included. That is, in the object area information 611 for the first object ob1 which is a subject of which distance information is to be acquired, data for the second object ob2 which is an obstacle but not a subject of which distance information is to be acquired may be included. That is, as illustrated in FIG. 6, in a bounding box delineating the object area information 611, not only the first object ob1 but also the second object ob2 may be included. Accordingly, in the sub depth information 621, depth information corresponding to not only the first object ob1 but also to the second object ob2 may be included.

Accordingly, when the processor 140 calculates the representative value of the sub depth information 621, depth information for the second object ob2 which is irrelevant to the first object ob1 may be reflected. Accordingly, the accuracy of the distance information of the first object ob1 might be reduced. For preventing this, when calculating the representative value of the sub depth information 621, the processor 140 may calculate the representative value based on the values of the remaining pixels excluding the pixels corresponding to the second object ob2 among the pixels corresponding to the sub depth information 621.

In an embodiment, when a plurality of objects exist in one bounding box, a problem that the accuracy of the distance of the target object is reduced due to another obstacle or extraneous object present in the input image, other than the target object, may be eliminated.

Figure 7:
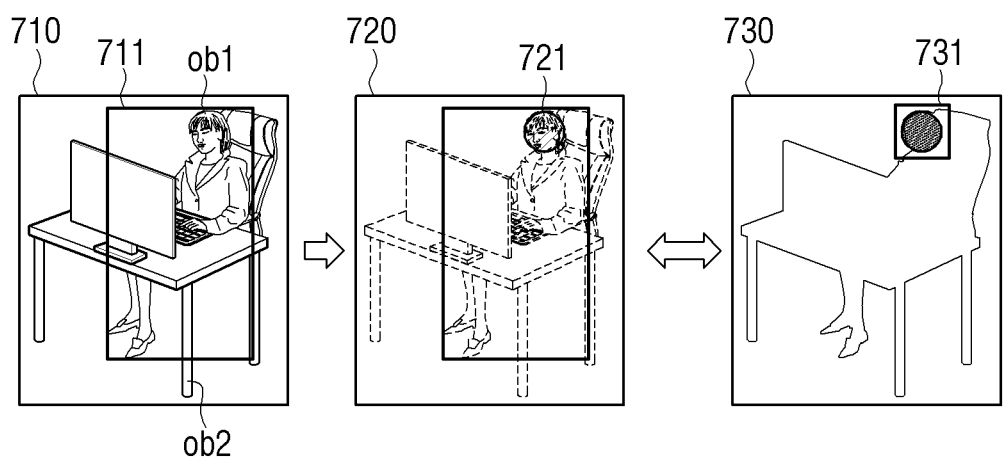
FIG. 7 is a diagram illustrating a method of acquiring distance information of an object according to an embodiment.

FIG. 7 is a diagram illustrating a method of acquiring distance information of an object according to an embodiment.

The processor 140 may acquire object area information 711 for a first object ob1 based on an input image 710 including the first object ob1. The processor 140 may acquire depth information 730 corresponding to the input image 710. The object area information 711 and the depth information 730 may respectively correspond to the object area information 611 and the depth information 620 in FIG. 6, and thus repeated descriptions will be omitted.

The processor 140 may acquire a feature map 720 including a feature area 721 for the first object ob1 based on the input image 710. The feature map 720 may include location information on the feature area 721 for the first object ob1. The feature area 721 may be located in a bounding box corresponding to the object area information 711.

The processor 140 may acquire or define the distance information of the first object ob1 based on the feature area 721 for the first object ob1. For example, the processor 140 may acquire the distance information of the first object ob1 based on the sub depth information 731 corresponding to the feature area 721 for the first object ob1 among the depth information 730. Specifically, the processor 140 may map the representative value of the pixels corresponding to the sub depth information 731 to the feature map 720 and acquire the distance information of the first object ob1.

As described above, the processor 140 may acquire the distance information of the first object ob1 based on the sub depth information 731 corresponding to the feature area 721 but not the depth information corresponding to the entire bounding box. Accordingly, the processor 140 may prevent the problem that the depth information of the second object ob2 is reflected when acquiring the distance information of the first object ob1. Thus, according to an embodiment, the processor 140 may acquire accurate distance information for a target object in case the target object (i.e., a person that is the first object) and an obstacle object (i.e., a desk) are overlapped. That is, according to an embodiment, accuracy of the distance information of the first object ob1 can be improved.

The feature map 720 may be acquired based on an intermediate feature value of a neural network model.

Figure 8:
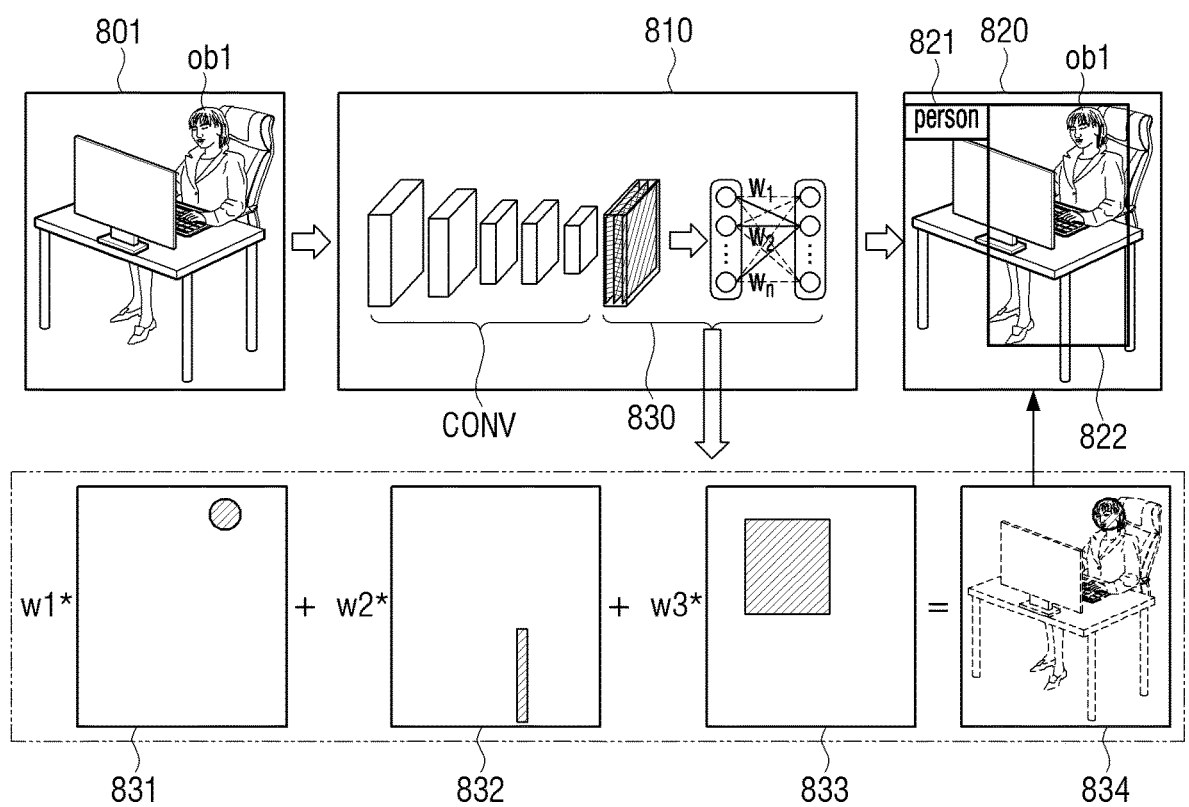
FIG. 8 is a diagram illustrating a method of acquiring a feature map according to an embodiment.

FIG. 8 is a diagram illustrating a method of acquiring a feature map according to an embodiment.

Referring to FIG. 8, the processor 140 may acquire a final feature value 820 by inputting an input image 801 into the neural network model 810. The final feature value 820 may include the type information 821 and the object area information 822 for the first object ob1. The neural network model 810 in FIG. 8 may correspond to the neural network model 410 in FIG. 4, and thus repeated descriptions will be omitted.

The neural network model 810 may include a plurality of intermediate layers 830. The processor 140 may acquire at least one intermediate feature value from the plurality of intermediate layers 830. For example, the processor 140 may acquire a first intermediate feature value 831, a second intermediate feature value 832, and a third intermediate feature value 833 output by all or some of the plurality of intermediate layers 830. The processor 140 may acquire a feature map 834 by summing up the first intermediate feature value 831, the second intermediate feature value 832, and the third intermediate feature value 833. The feature map 834 may be calculated as a sum of the values of multiplying weights w1, w2, w3 with each of the first intermediate feature value 831, the second intermediate feature value 832, and the third intermediate feature value 833.

Each of the first intermediate feature value 831, the second intermediate feature value 832, and the third intermediate feature value 833 may include location information for the feature areas for the at least one object. For example, the first intermediate feature value 831 may include location information for the feature area for the first object ob1.

The above-described is based on an example where there is one object of which distance information is to be extracted in an input image. However, this is not limiting, and the processor 140 may acquire distance information for a plurality of objects included in an input image.

Figure 9:
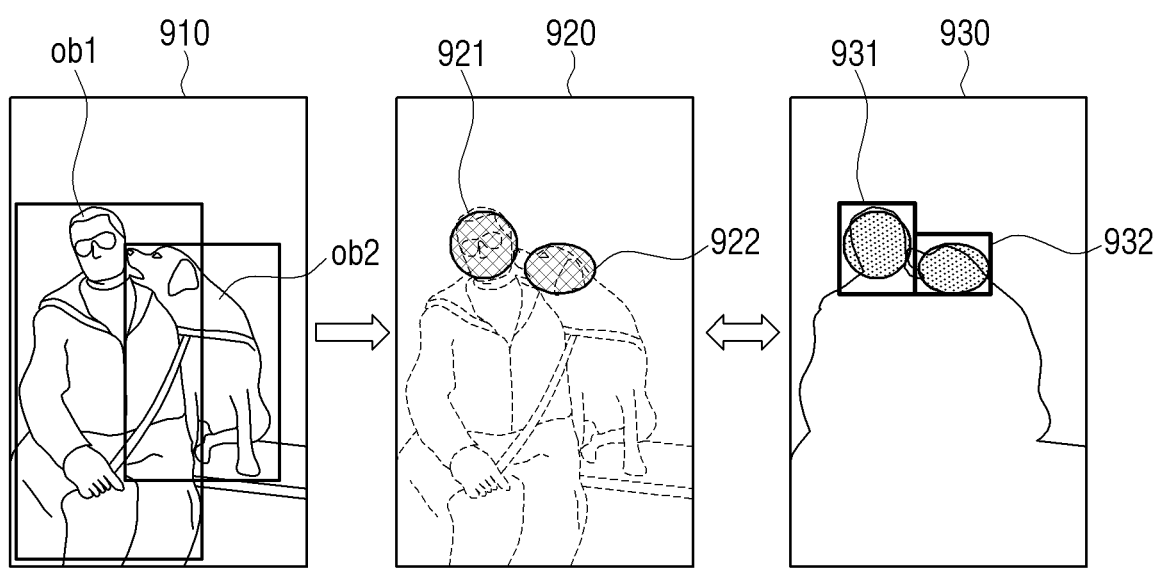
FIG. 9 is a diagram illustrating a method of acquiring distance information of an object according to an embodiment.

FIG. 9 is a diagram illustrating a method of acquiring distance information of an object according to an embodiment.

The processor 140 may acquire an input image 910 including a first object ob1 and a second object ob2 and depth information 930 corresponding to the input image 910. The processor 140 may acquire object area information for each of the first object ob1 and the second object ob2 based on the input image 910. The processor 140 may acquire object area information for each of the first object ob1 and the second object ob2 based on the final feature value acquired by inputting the input image 910 into the neural network model.

The processor 140 may acquire a feature map 920 based on the input image 910. The feature map 920 may include information on a first feature area 921 for the first object ob1 and a second feature area 922 for the second object ob2. The processor 140 may respectively identify the first feature area 921 and the second feature area 922. The processor 140 may acquire information for each of the first feature area 921 and the second feature area 922 based on the intermediate feature value acquired by inputting the input image 910 into the neural network model.

The processor 140 may acquire distance information for each of the first object ob1 and the second object ob2 based on the feature map 920 and the depth information 930. Specifically, the processor 140 may identify a first feature pixel 931 corresponding to the first feature area 921 and a second feature pixel 932 corresponding to the second feature area 922 among the depth information 930. The processor 140 may acquire a first representative value based on the first feature pixel 931. The processor 140 may acquire a second representative value based on the second feature pixel 932. The processor 140 may map the first representative value and the second representative value to each of the first feature area 921 and the second feature area 922 and acquire distance information of the first object ob1 and the second object ob2.

As described above, the processor 140 may acquire distance of objects based on feature areas. Accordingly, in case the bounding boxes of each of the first object ob1 and the second object ob2 are overlapped as in FIG. 9, the processor 140 may acquire distance information for each of the first object ob1 and the second object ob2 accurately. However, this is not limiting and the boxes do not necessarily need to overlap and may only touch or be separated.

Figure 10:
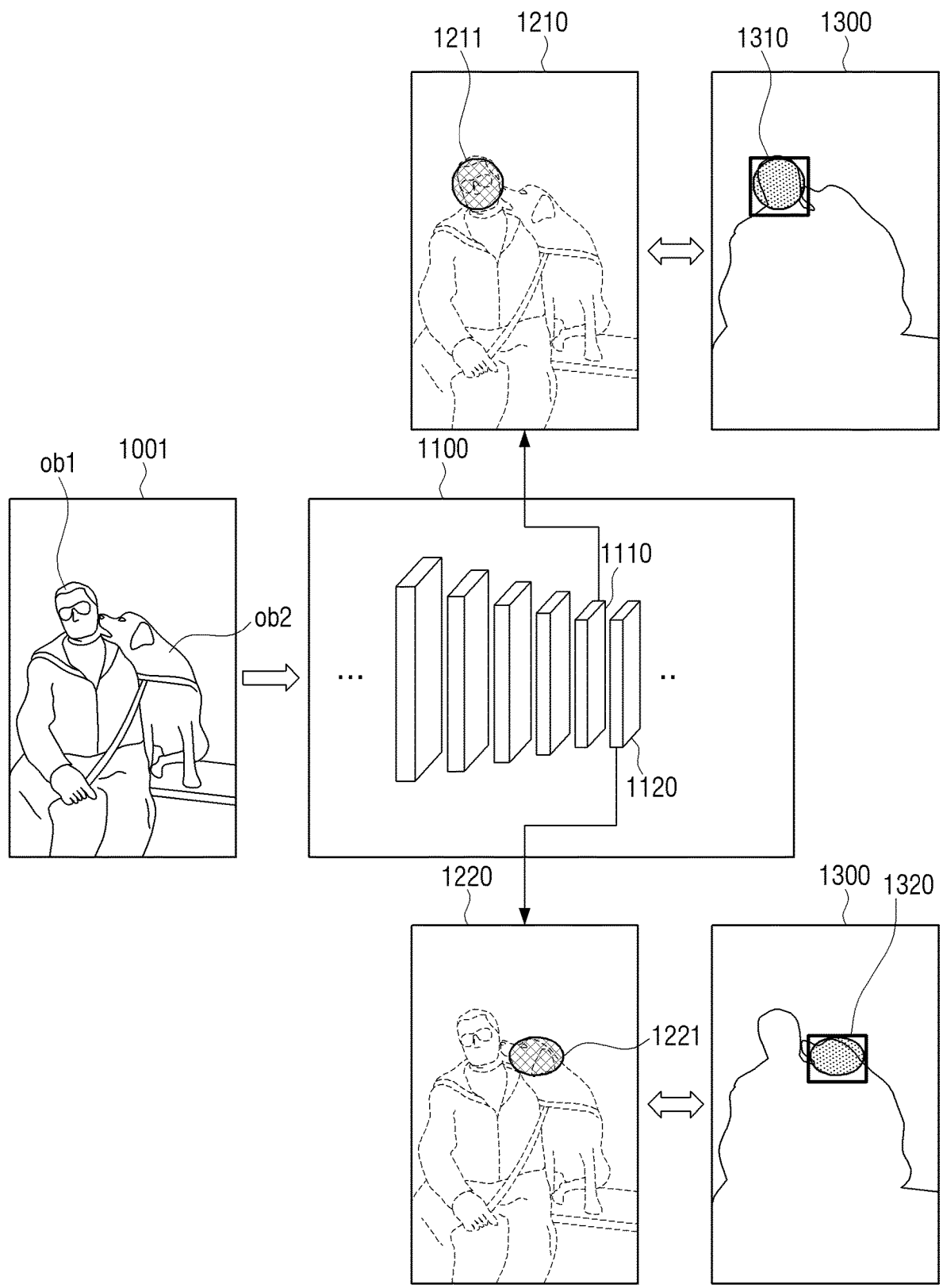
FIG. 10 is a diagram illustrating a method of acquiring distance information of an object according to an embodiment.

FIG. 10 is a diagram illustrating a method of acquiring distance information of an object according to an embodiment.

The processor 140 may input an input image 1001 including the first object ob1 and the second object ob2 into the neural network model 1100. The neural network model 1100 may include at least one intermediate layer corresponding to objects having specific types. For example, the neural network model 1100 may include a first intermediate layer 1110 corresponding to the first object ob1 of the first type (i.e., a person). The neural network model 1100 may include a second intermediate layer 1120 corresponding to the second object ob2 of the second type (i.e., a dog). The first intermediate layer 1110 may output a first intermediate feature value 1210. The processor 140 may acquire information on the first feature area 1211 corresponding to the first object ob1 based on the first intermediate feature value 1210. The second intermediate layer 1120 may output a second intermediate feature value 1220. The processor 140 may acquire information on the second feature area 1221 corresponding to the second object ob2 based on the second intermediate feature value 1220.

As described above, an intermediate layer included in the neural network model 1100 may correspond to an object of a specific type. The processor 140 may acquire type information for the first object ob1 and the second object ob2 without a final feature value of the neural network model 1100. The processor 140 may acquire distance information for each of the first object ob1 and the second object ob2 based on depth information 1300 corresponding to the input image 1001. Specifically, the processor 140 may acquire first sub depth information 1310 corresponding to the first feature area 1211 based on information on the first feature area 1211. The processor 140 may map the first sub depth information 1310 to the first intermediate feature value 1210 and acquire distance information for the first object ob1. Likewise, the processor 140 may acquire second sub depth information 1320 corresponding to the second feature area 1221 based on information on the second feature area 1221. The processor 140 may map the second sub depth information 1320 to the second intermediate feature value 1220 and acquire distance information for the second object ob2.

Although only two objects are described, the number of the objects and the object types may be more than 2, for example, 3, 4, . . . 10, etc.

For example, as described above, in case at least one or some of a plurality of intermediate layers included in a neural network model correspond to an object of a specific type, the processor 140 may acquire the distance information of the object based on an intermediate feature value and not a feature map.

The processor 140 may generate an image based on the acquired information on an object.

Figure 11:
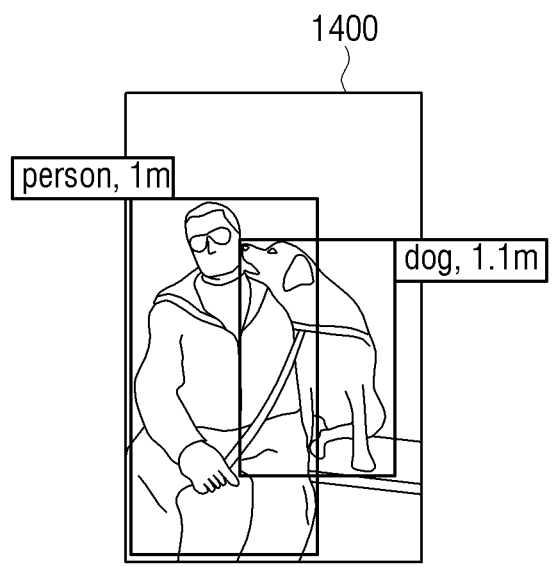
FIG. 11 is a diagram illustrating an output image according to an embodiment.

FIG. 11 is a diagram illustrating an output image according to an embodiment.

The processor 140 may generate an output image 1400 based on the type information, the distance information, and the object area information of an object. An output image may include display of an object area. For example, an output image may include a bounding box displayed around an object area. Also, in an output image, type information of objects (i.e., a person and a dog in FIG. 11) may be displayed around a bounding box. In addition, in an output image, type information of an object, or distance information of an object may be displayed around an object area.

The processor 140 may control the display such that a generated output message is displayed through the display included in the electronic apparatus 100 as described above. Alternatively, the processor 140 may transmit a signal to an external apparatus through the communication interface 130 such that a generated output image is displayed through another external apparatus. Through these operations, the electronic apparatus 100 may provide various information regarding objects to a user.

Figure 12:
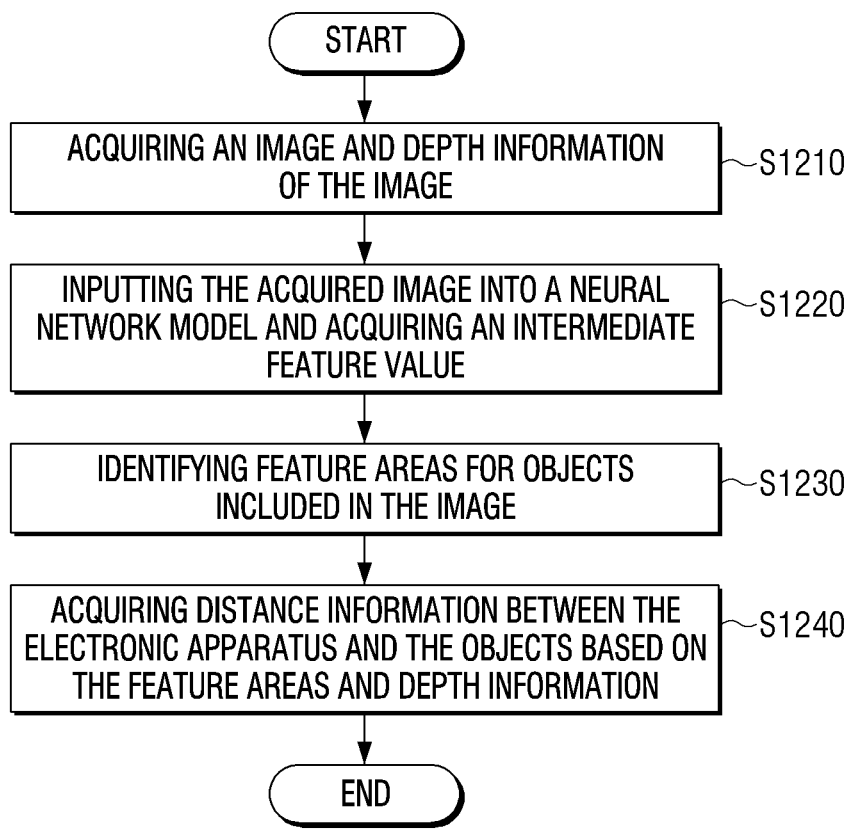
FIG. 12 is a flow chart illustrating a controlling method according to an embodiment.

FIG. 12 is a flow chart illustrating a controlling method according to an embodiment.

Referring to FIG. 12, the control method may include the operation S1210 of acquiring an image and depth information of the image, the operation S1220 of inputting the acquired image into a neural network model and acquiring an intermediate feature value, the operation S1230 of identifying feature areas for objects included in the image, and the operation S1240 of acquiring distance information between the electronic apparatus and the objects based on the feature areas and depth information.

The processor 140 may acquire an image and depth information of the image at operation S1210. The processor 140 may acquire an image that the camera 110 of the electronic apparatus 100 photographed the surroundings of the electronic apparatus 100 and depth information of the image. The image may be an RGB image that the RGB camera included in the camera 110 photographed, and depth information of the image may be a depth image that the depth camera included in the camera 110 photographed. The processor 140 may acquire an image that an external apparatus photographed and depth information of the image.

The processor 140 may input the acquired image into a neural network model and acquire an intermediate feature value at operation S1220. The neural network model may be trained to acquire information on objects included in an image. Information on objects may include type information, distance information, and location information of the objects.

The processor 140 may identify feature areas for objects included in the image at operation S1230. The processor 140 may identify type information for the objects and information on the object areas based on a final feature value acquired from the neural network model. The processor 140 may map a feature map acquired based on the intermediate feature value and the object areas and identify feature areas for the objects. The processor 140 may sum up a plurality of intermediate feature values acquired by a predefined intermediate layer of the neural network model and acquire a feature map.

Further, the processor 140 may acquire distance information between the electronic apparatus and the objects based on the feature areas for the objects and depth information of the image at operation S1240. The processor 140 may acquire a representative value based on feature pixels corresponding to the feature areas among the depth information of the image. The processor 140 may map the acquired representative value to the feature areas and acquire distance information between the electronic apparatus and the objects.

The electronic apparatus 100 may be implemented as various types of electronic apparatuses. For example, the electronic apparatus 100 may be implemented as a robot cleaner, an automated guided vehicle (AGV), etc. The processor 140 may generate a driving control signal of the electronic apparatus 100 based on the acquired information on the objects.

Embodiments described above may be implemented by using a recording medium that can be read by a computer or an apparatus similar to a computer, by using software, hardware, or a combination thereof. In some cases, embodiments described herein may be implemented by one or more processors. According to implementation by software, processes and functions described herein may be implemented by separate software modules. Each of the software modules can perform one or more functions and operations described herein.

Embodiments may be implemented as software containing one or more instructions that are stored in machine-readable (e.g., computer-readable) storage medium (e.g., internal memory or external memory). A processor may call instructions from a storage medium and is operable in accordance with the called instructions, including an electronic apparatus (e.g., the electronic apparatus 100). When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A method of controlling an electronic apparatus, the method comprising:
    acquiring an image and depth information of the acquired image;
    inputting the acquired image into a neural network model trained to acquire information on objects included in the acquired image;
    acquiring an intermediate feature value output by an intermediate layer of the neural network model;
    identifying a feature area for at least one object among the objects included in the acquired image based on the intermediate feature value; and
    acquiring distance information between the electronic apparatus and the at least one object based on the feature area for the at least one object and the depth information.

2. The method of claim 1, further comprising:
    inputting the intermediate feature value into a final layer of the neural network model;
    acquiring a final feature value output by the final layer; and
    identifying type information for the objects, respectively, that are included in the acquired image and information on object areas where the objects are present, respectively, in the acquired image, based on the final feature value,
    wherein the identifying the feature area further comprises:
        acquiring a feature map including feature areas for the objects, respectively, based on the intermediate feature value,
        mapping the feature map and the object areas for each of the objects; and
        identifying the feature areas corresponding to each of the objects based on the mapping.

3. The method of claim 2, wherein the acquiring the feature map further comprises:
    acquiring the feature map by summing up a plurality of intermediate feature values acquired by some of a plurality of intermediate layers, respectively,
    wherein the intermediate layer includes the some or all of the plurality of intermediate layers.

4. The method of claim 2, wherein the acquiring the distance information further comprises acquiring the distance information between the electronic apparatus and the objects, respectively, based on the feature areas and the depth information, and
    the method further comprises:
        generating an output image at least based on the final feature value; and
        displaying the type information and the distance information around the object areas for the objects, respectively, on the output image.

5. The method of claim 1, wherein the acquiring the distance information further comprises:
    acquiring a representative value based on feature pixels corresponding to the feature area present in the depth information;
    mapping the representative value to the feature area; and
    acquiring the distance information based on the mapping.

6. The method of claim 1, wherein the acquiring the depth information further comprises:

acquiring the depth information by using a depth camera or a stereo camera, or acquiring the depth information by analyzing the acquired image.

7. The method of claim 1, wherein the intermediate layer includes a first intermediate layer corresponding to a first object of a first type and a second intermediate layer corresponding to a second object of a second type, among the objects, and the identifying further comprises identifying a first feature area for the first object having the first type among the objects based on a first intermediate feature value output by the first intermediate layer, and identifying a second feature area for the second object having the second type among the objects based on a second intermediate feature value output by the second intermediate layer, and the acquiring the distance information further comprises:
mapping a first representative value calculated based on a first feature pixel corresponding to the first feature area present in the depth information, to the first feature area, and a second representative value calculated based on a second feature pixel corresponding to the second feature area present in the depth information, to the second feature area, and acquiring the distance information between the electronic apparatus and the first object and the second object, based on the mapping, respectively, wherein the at least one object is one among the first object and the second object.

8. The method of claim 2, further comprising:
generating a driving control signal of the electronic apparatus based on the type information, the information on the object areas, and the distance information.

9. An electronic apparatus comprising:
a memory configured to store at least one instruction; and
a processor configured to execute the at least one instruction,
wherein the processor, by executing the at least one instruction, is further configured to:
acquire an image and depth information of the acquired image,
input the acquired image into a neural network model trained to acquire information on objects included in the acquired image,
acquire an intermediate feature value output by an intermediate layer of the neural network model,
identify a feature area for at least one object among the objects included in the acquired image based on the intermediate feature value, and
acquire distance information between the electronic apparatus and the at least one object based on the feature area for the at least one object and the depth information.

10. The electronic apparatus of claim 9, wherein the processor is further configured to:
input the intermediate feature value into a final layer of the neural network model,
acquire a final feature value output by the final layer,
identify type information for the objects, respectively, that are included in the acquired image and information on object areas where the objects are present, respectively, in the acquired image, based on the final feature value, and
acquire a feature map including feature areas for the objects, respectively, that are included in the acquired image based on the intermediate feature value.

11. The electronic apparatus of claim 10, wherein the processor is further configured to:
map the feature map and the object areas for each of the objects, and
identify the feature areas corresponding to each of the objects based on the mapping.

12. The electronic apparatus of claim 10, wherein the feature map is acquired by summing up a plurality of intermediate feature values acquired by some of a plurality of intermediate layers, respectively,
wherein the intermediate layer includes the some or all of the plurality of intermediate layers.

13. The electronic apparatus of claim 9, wherein the processor is further configured to:
acquire a representative value based on feature pixels corresponding to the feature area present in the depth information,
map the representative value to the feature area, and
acquire the distance information based on the mapping.

14. The electronic apparatus of claim 10, wherein the processor is further configured to:
acquire the distance information between the electronic apparatus and the objects, respectively, based on the feature areas and the depth information, and
generate an output image at least based on the final feature value, so that the generated output image includes the type information and the distance information for the objects, respectively.

15. The electronic apparatus of claim 14, further comprising:
a display,
wherein the processor is further configured to:
control the display to display the output image so that the type information and the distance information for the objects are displayed around the object areas, respectively.

16. The electronic apparatus of claim 14, wherein the processor is further configured to:
transmit a signal to an external apparatus through a communication interface such that the output image is output through the external apparatus.

17. The electronic apparatus of claim 9, wherein the processor is further configured to:
acquire the depth information through a depth camera or a stereo camera, or acquire the depth information by analyzing the acquired image.

18. The electronic apparatus of claim 9, wherein the intermediate layer includes a first intermediate layer corresponding to a first object of a first type and a second intermediate layer corresponding to a second object of a second type, among the objects, and
the processor is further configured to:
identify a first feature area for the first object of the first type based on a first intermediate feature value output by the first intermediate layer,
identify a second feature area for the second object having the second type among the objects based on a second intermediate feature value output by the second intermediate layer,
acquire a first representative value based on a first feature pixel corresponding to the first feature area present in the depth information,
acquire a second representative value based on a second feature pixel corresponding to the second feature area present in the depth information, map the first representative value to the first feature area and the second representative value to the second feature area, and acquire the distance information between the electronic apparatus and the first object and the second object, based on the mapping, respectively, wherein the at least one object is one among the first object and the second object.

19. The electronic apparatus of claim 10, wherein the processor is further configured to generate a driving control signal of the electronic apparatus based on the type information, the information on the object areas, and the distance information.

20. A non-transitory computer-readable medium storing one or more instructions thereon which, when executed by at least one processor, cause the at least one processor to execute the method of claim 1.

* * * * *